(12) United States Patent
Wallström et al.

(10) Patent No.: US 7,819,610 B2
(45) Date of Patent: Oct. 26, 2010

(54) TOOL FOR CHIP REMOVING MACHINING, AS WELL AS A CUTTING INSERT AND A BASIC BODY THEREFOR

(75) Inventors: Lars-Gunnar Wallström, Rosersberg (SE); Åke Johansson, Sandviken (SE); Ove Lund, Årsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 83 days.

(21) Appl. No.: 12/010,364

(22) Filed: Jan. 24, 2008

(65) Prior Publication Data

US 2008/0181731 A1   Jul. 31, 2008

(30) Foreign Application Priority Data

Jan. 31, 2007  (SE) .................................... 0700250

(51) Int. Cl.
*B23P 15/34*   (2006.01)
(52) U.S. Cl. ........................ 407/113; 407/114
(58) Field of Classification Search ................ 407/102, 407/103, 113, 116, 48
See application file for complete search history.

(56) References Cited

U.S. PATENT DOCUMENTS

| | | | | |
|---|---|---|---|---|
| 3,629,919 | A |    | 12/1971 | Trevarrow, Jr. |
| 4,209,047 | A | * | 6/1980  | Weill ......................... 144/208.8 |
| 4,315,706 | A | * | 2/1982  | Erkfritz ...................... 407/101 |
| 4,479,294 | A | * | 10/1984 | Sekimoto et al. ......... 29/893.32 |
| 5,727,910 | A | * | 3/1998  | Leeb ............................ 407/34 |
| 5,810,518 | A | * | 9/1998  | Wiman et al. ............... 407/102 |
| 5,931,613 | A | * | 8/1999  | Larsson ....................... 407/103 |

(Continued)

FOREIGN PATENT DOCUMENTS

DE          3446455 A1  *  6/1986

(Continued)

*Primary Examiner*—Jason Daniel Prone
*Assistant Examiner*—Jennifer Swinney
(74) *Attorney, Agent, or Firm*—Drinker Biddle & Reath LLP

(57) ABSTRACT

A tool intended for chip removing machining is disclosed. The tool is of the type that has a basic body and an indexable cutting insert that can be connected to the basic body via an interface including a primary connecting surface in the basic body and a secondary connecting surface in the cutting insert. Among two cooperating support flanks included in the connecting surface of the basic body, one is situated on a level above the other in order to form a lateral support for the cutting insert. In the connecting surface of the cutting insert, contact flanks are included that, together with the clearance surface of the cutting insert, form a V-shapedly converging wedge part that can be applied in a seat delimited by the support flanks, the contact flank being urged against the low-positioned support flank of the basic body, while an upper part of the clearance surface of the cutting insert is urged against the high-positioned support flank. By means of the high-positioned support flank, large cutting forces can be carried in a dominant line of action, the interface in other respects efficiently counteracting such tendencies to dislodging/turning of the cutting insert that are caused by more moderate forces in other lines of action. In addition to the proper tool, a cutting insert and a basic body for the tool, per se, are also disclosed.

36 Claims, 8 Drawing Sheets

U.S. PATENT DOCUMENTS

| | | | |
|---|---|---|---|
| 6,004,081 A * | 12/1999 | Hellstrom et al. | 407/103 |
| 6,146,060 A | 11/2000 | Rydberg et al. | |
| 6,238,133 B1 * | 5/2001 | DeRoche et al. | 403/359.1 |
| 6,840,716 B2 * | 1/2005 | Morgulis et al. | 407/34 |
| 6,872,033 B2 | 3/2005 | Rydberg | |
| 7,001,114 B2 * | 2/2006 | Blucher et al. | 407/103 |
| 7,063,487 B2 * | 6/2006 | Hessman et al. | 407/11 |
| 7,387,474 B2 * | 6/2008 | Edler et al. | 407/113 |
| 7,455,482 B2 * | 11/2008 | Lundvall | 407/113 |
| 2006/0056926 A1 * | 3/2006 | Riviere et al. | 407/40 |

FOREIGN PATENT DOCUMENTS

| | | |
|---|---|---|
| EP | 1364733 A1 * | 11/2003 |
| EP | 1700656 A2 * | 9/2006 |
| JP | 10043926 A * | 2/1998 |
| SE | 9702500-1 | 2/1999 |
| SE | 0101752-4 | 1/2003 |

* cited by examiner

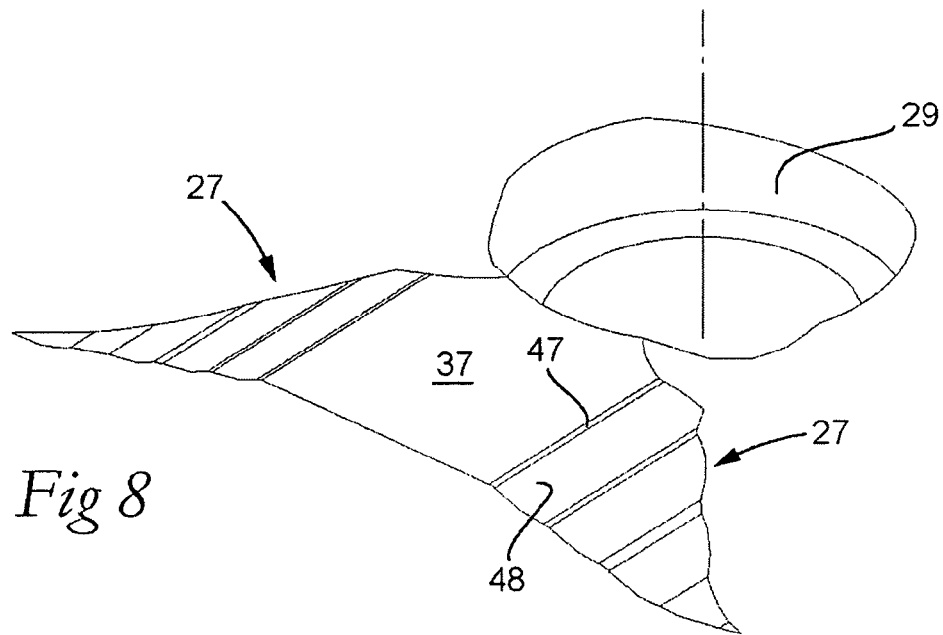
Fig 8
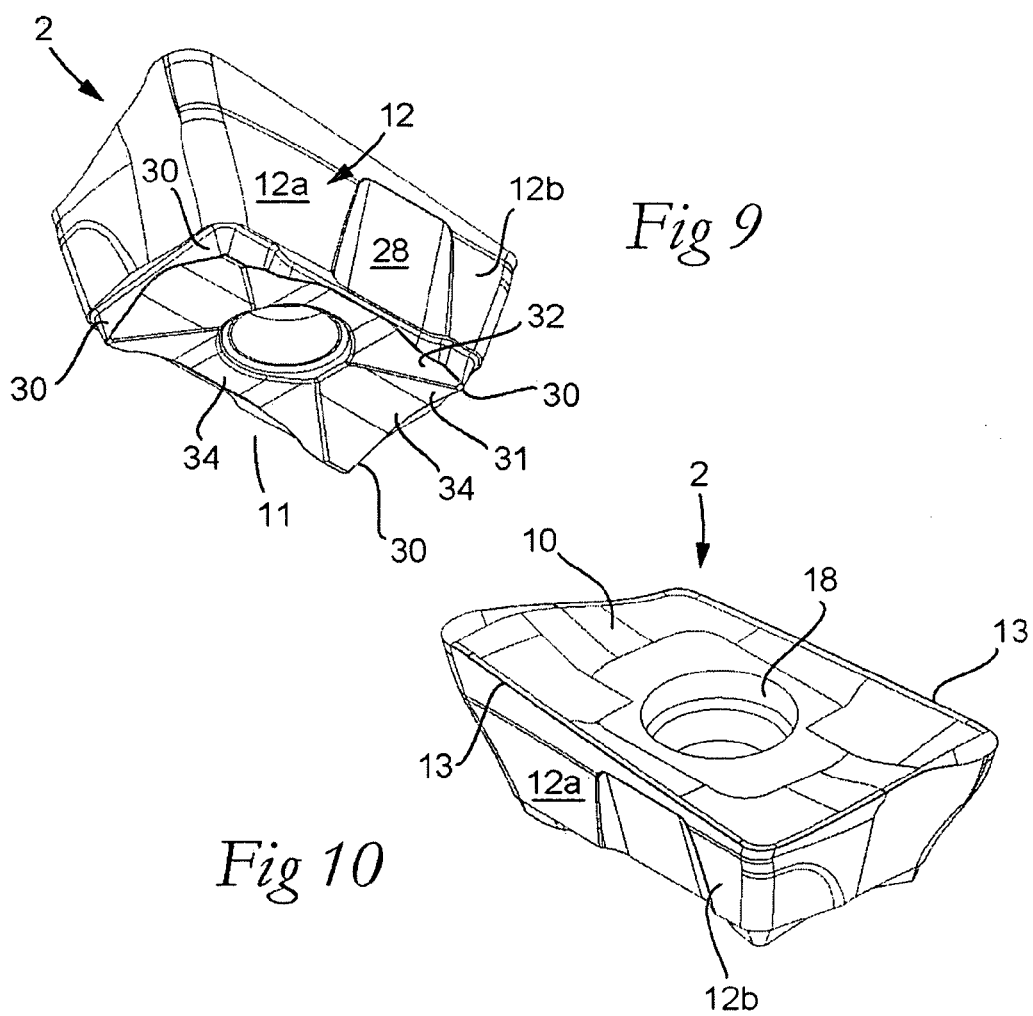
Fig 9
Fig 10

TOOL FOR CHIP REMOVING MACHINING, AS WELL AS A CUTTING INSERT AND A BASIC BODY THEREFOR

RELATED APPLICATION DATA

This application claims priority under 35 U.S.C. §119 to Swedish Application No. 0700250-4, filed in Sweden on Jan. 31, 2007, the entire contents of which are incorporated herein by reference.

FIELD

In a first aspect, the present disclosure relates to a tool intended for chip removing machining and of the type that comprises a basic body and a cutting insert, which includes an upperside and an underside between which a centre axis and, adjacent to a cutting edge, a peripheral clearance surface extend, the basic body including a primary connecting surface that is arranged for locking of the cutting insert and has engagement means delimited by support flanks that are located in a common bottom plane and inclined in relation to the same, and the cutting insert including a secondary connecting surface that is formed in the underside and has engagement means delimited by contact flanks that are located in a common basal plane and inclined in relation to the same. In further aspects, the present disclosure also relates to an indexable cutting insert as well as a basic body for tools of the kind in question.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Within the field of chip removing or cutting machining of, above all, blanks of metal, a continuous development is going on with the purpose of making more effective not only the capacity of the tools to carry out the machining in a fast and accurate way, but also the manufacture of the different parts of the tools in the form of basic bodies (holders) and replaceable cutting inserts. A trend is to reduce the costs of the manufacture of the tools. This has, among other things, led to cutting inserts manufactured from cemented carbide or the like, which are most common on the market, in connection with compression-moulding and sintering having obtained a better and better dimensional accuracy. In order to obtain a good precision of the cutting inserts, previously it was necessary to subject the same to expensive grinding operations, but with the improved compression-moulding and sintering technique, it has become possible to use direct-pressed, i.e., unground, cutting inserts in more and more applications. However, the development has not progressed further than that the tool designer still has to allow for a dimensional variation in the order of ±0.5% of the nominal dimensions of the cutting inserts.

Older cutting tools of the type equipped with replaceable and indexable cutting inserts were designed with fairly simple means for fixing the cutting insert in the basic body of the tool. More precisely, the basic body was formed with a so-called insert seat, which was delimited by a plane bottom surface and two plane side support surfaces, orientated at an angle to each other, against which plane contact surfaces of the cutting insert were urged, usually by means of a screw or a clamp. In order to give an acceptable machining precision, said cutting inserts had to be subjected to expensive grinding along the contact surfaces thereof.

Recently have, among other things as a consequence of the improved insert manufacturing technique, tools been developed, the interfaces of which between the basic body and the cutting insert are formed with connecting surfaces that individually include male-like as well as female-like engagement means engaging each other. Originally, said connecting surfaces consisted of simple, so-called serration connecting surfaces of the type that includes a plurality of parallel, male-like ridges and female-like grooves, the ridges of which in one of the connecting surfaces engage the grooves in the other connecting surface, and vice versa. A dominant angle between the pairs of flanks of the ridges and grooves in such connecting surfaces was 60°. In the next stage of development, said interfaces were refined by the fact that certain ridges were orientated at right or other angles to the other ridges, often in combination with the number of ridges and grooves being reduced to a minimum. Such so-called cross serration surfaces have the advantage of locking the cutting insert in two coordinate directions instead of only one, as was the case with the simple, parallel ridges.

During the development up to today's modern interfaces, which make use of crosswise acting male and female members in the form of, e.g., ridges and grooves, the flank angles of the members have increased from the fairly acute 60° up to 90° and even more. The object hereof has, among other things, been to facilitate the possibilities of accommodating possible, small form defects of the cutting insert without jeopardizing the positioning of the cutting edges in relation to the basic body. Characteristic of the modern interfaces is furthermore that all flanks of the engagement means included in the connecting surface of the cutting insert are essentially situated in a common basal plane along the underside of the cutting insert, in the same way as all flanks of the engagement means included in the connecting surface of the basic body are essentially situated in a common bottom plane (which coincides with the basal plane of the cutting insert, when the cutting insert is mounted in the basic body).

Examples of cutting tools having later times' interfaces are disclosed in for instance: U.S. Pat. No. 3,629,919, U.S. Pat. No. 5,810,518, U.S. Pat. No. 5,931,613, U.S. Pat. No. 6,146,060, SE 9702500-1, and SE 0101752-4.

Many known tools having the modern type of interface between the cutting insert and basic body work in a meritorious way in certain applications, but insufficiently in others. Thus, it has turned out that cutting inserts, which work under severe conditions and are subjected to cutting forces that are dominating in one direction but not in others, run the risk of being dislodged from the positions thereof. This is in particular the case in milling, where the milling or cutting insert is subjected to considerable radial forces, but moderate axial forces. More precisely, milling is an intermittent machining during which the cutting insert, each time it impinges on or engages the workpiece, is subjected to extreme, instantaneous radial forces that aim to displace and turn the same, and in such a way deform the flanks included in the primary connecting surface of the basic body. In addition, the cutting insert tends to lift at the rear edge.

SUMMARY

The present disclosure aims at obviating the above-mentioned disadvantages of previously known cutting tools and at providing an improved cutting tool. Therefore, a primary object of the invention is to provide a cutting tool the interface of which between the basic body and cutting insert guarantees a robust and reliable anchorage of such severely exposed, indexable cutting inserts that are subjected to cutting forces that are dominant in a line of action. Particularly, the milling cutter tool has a good capacity to resist large radial forces. It is also an object to provide a cutting tool, the interface of which between the cutting insert and basic body minimizes the risk of deformations in the comparatively soft connecting surface of the basic body. Yet further, an object is to attain the stable anchorage of the cutting insert without making the manufacture of the same more expensive, e.g., by far-reaching requirements of grinding of the same. In other words, it should generally be possible to manufacture the cutting insert by direct pressing. Furthermore, the geometry of the interface should enable a tool design that allows clamping of the cutting insert by means of not only screws, but according to needs, also by means of clamps, wedges or the like.

Disclosed herein is the idea of combining the property of the simple insert seat to afford the cutting insert a stable and resistant lateral support in one line of force action, with the modern interface's moderate requirements of dimensional accuracy of the cutting insert and the connecting surfaces of the basic body, respectively. This is realized by the fact that the primary connecting surface of the basic body is formed with a saddle-like part that is delimited by two converging support flanks and directed perpendicularly to a third flank, which delimits a V-shapedly diverging seat together with a fourth support flank, which is situated on a level above a bottom plane in which the first-mentioned support flanks are situated together, at the same time as the secondary connecting surface of the cutting insert is formed with a chute in which two, V-shapedly diverging contact flanks are included, which are urged against the support flanks of the saddle part, as well as with a pair of contact flanks located in flush with each other, which, together with a part of the clearance surface of the cutting insert, delimit an acute-angled tapering wedge part that is pressable into said seat.

In a first aspect, the disclosure relates to a cutting tool achieving at least the primary object with two cooperating support flanks, which together delimit a V-shapedly diverging seat in the basic body, a first support flank is situated in said bottom plane, and a second support flank on a level above the same, and with two cooperating contact flanks, which together delimit a V-shapedly converging wedge part of the cutting insert, a first contact flank is situated in said basal plane, while a second contact flank is a part of the clearance surface situated on a level above the basal plane and urged against the second support flank.

In a second aspect, the disclosure relates to an indexable cutting insert. The features of this cutting insert include an engagement means that includes four knobs that are located at corners in an imaginary, regular quadrangle and individually include two flanks running perpendicularly to each other, a first flank situated in flush with an analogous first flank of an adjacent knob, and a second flank facing an analogous second flank of the same adjacent knob to delimit a V-shapedly diverging chute, said pairs of first flanks being arranged to, together with a part of the clearance surface situated on a level above the basal plane, form a wedge part of the cutting insert.

In a third aspect, the disclosure also relates to a basic body as such intended for chip-removing tools. The features of the basic body include two cooperating flanks, which together delimit a V-shapedly diverging seat, a first flank situated in said bottom plane and a second flank situated on a level above the bottom plane.

An exemplary embodiment of a tool for chip removing machining comprises a basic body and a cutting insert, which includes an upperside and an underside between which a centre axis and, adjacent to a cutting edge, a peripheral clearance surface extend, wherein the basic body includes a primary connecting surface that is arranged for locking of the cutting insert and has engagement means delimited by support flanks that are located in a common bottom plane and inclined in relation to the same, wherein the cutting insert includes a secondary connecting surface that is formed in the underside and has engagement means delimited by contact flanks that are located in a common basal plane and inclined in relation to the same, wherein, among two cooperating support flanks, which together delimit a V-shapedly diverging seat in the basic body, a first support flank is situated in said bottom plane, and a second support flank on a level above the same, and wherein among two cooperating contact flanks, which together delimit a V-shapedly converging wedge part of the cutting insert, a first contact flank is situated in said basal plane, while a second contact flank is a part of the clearance surface situated on a level above the basal plane and urged against the second support flank.

An exemplary embodiment of an indexable cutting insert for tools for chip removing machining comprises an upperside and an underside between which a centre axis and, adjacent to a cutting edge, a peripheral clearance surface extend, as well as a connecting surface formed in the underside and in which there are included engagement means having flanks that are situated in a common basal plane and inclined in relation to the same, wherein the engagement means includes four knobs that are located at corners in an imaginary, regular quadrangle and individually include two flanks running perpendicularly to each other, a first flank situated in flush with an analogous first flank of an adjacent knob, and a second flank facing an analogous second flank of the same adjacent knob to delimit a V-shapedly diverging chute, said pairs of first flanks being arranged to, together with a part of the clearance surface situated on a level above the basal plane, form a wedge part of the cutting insert.

An exemplary embodiment of a basic body for tools for chip removing machining comprises a connecting surface for locking of an indexable cutting insert and having engagement means delimited by flanks that are located in a common bottom plane and inclined in relation to the same, wherein, among two cooperating flanks, which together delimit a V-shapedly diverging seat, a first flank situated in said bottom plane and a second flank situated on a level above the bottom plane.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 8 is an extremely enlarged detailed view, which illustrates the nature of a saddle part included in the primary connecting surface.

FIG. 9 is a bottom perspective view of an alternative, elongate cutting insert.

FIG. 10 is a top perspective view of the cutting insert according to FIG. 9.

DETAILED DESCRIPTION

Figure 1:
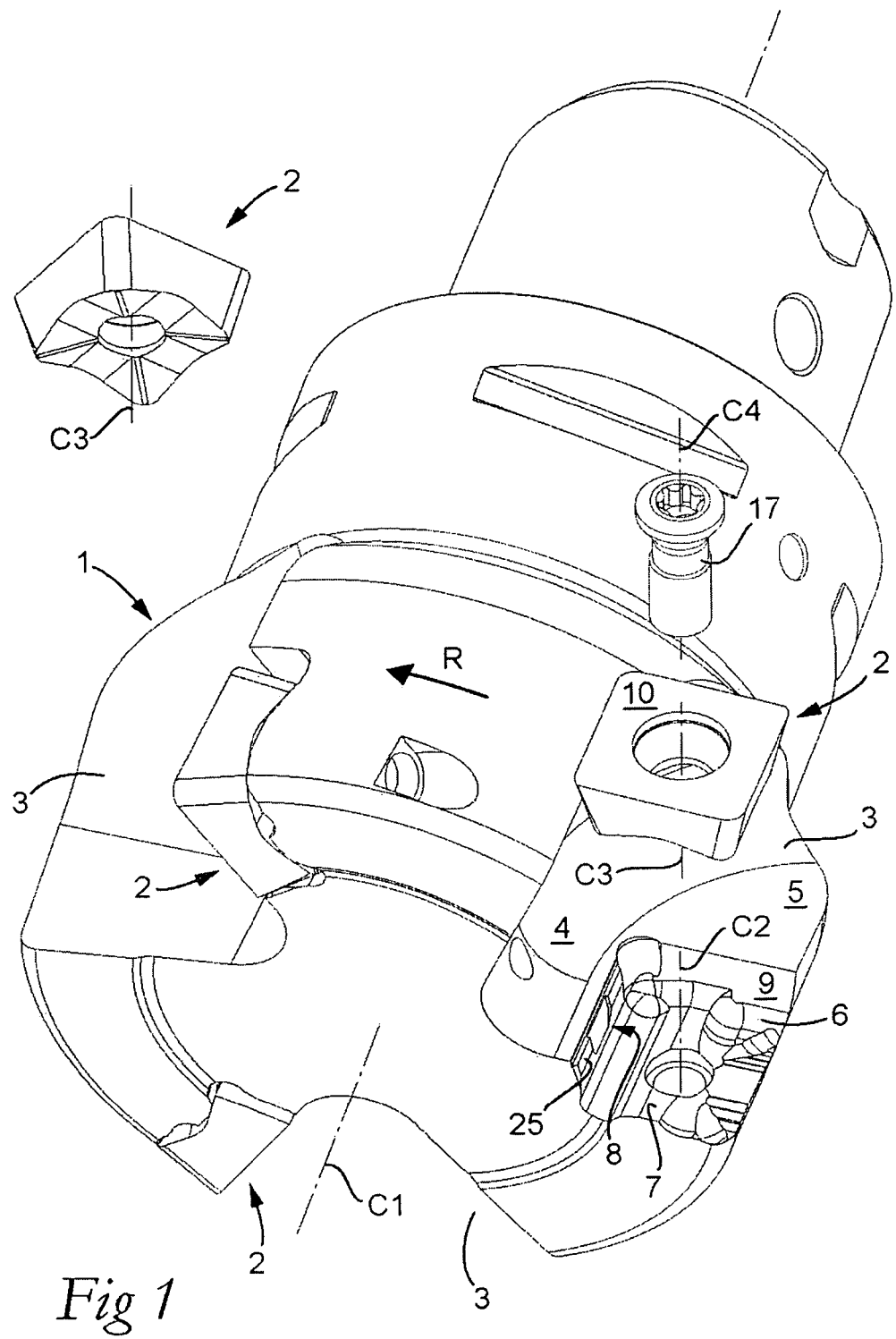
FIG. 1 is a perspective exploded view showing a cutting tool in the form of a milling cutter, in which a rotatable basic body is included as well as a number of indexable cutting inserts, one of which is shown separated from the basic body, more precisely in a top perspective view as well as in a bottom perspective view.

In FIG. 1, a tool in the form of a milling cutter is exemplified, which in the usual way includes a basic body 1 and a number of milling or cutting inserts 2, which are detachably mounted on the basic body. The basic body 1 is rotatable in a predetermined rotational direction R around a centre axis designated C1, and includes, in a front end, a number of chip spaces 3 for each one of the cutting inserts 2. In this case, the individual chip space 3 is delimited by an arched surface 4, as well as by a plane shoulder surface 5 in which a pocket 6 is countersunk for the receipt of the cutting insert. Said pocket 6 is in turn delimited by a bottom in the form of a primary connecting surface 7, as well as by two side surfaces 8, 9, the first-mentioned one 8 of which is turned radially outward from the centre axis C1, while the last-mentioned one 9 is turned forward in the axial direction.

Figure 2:
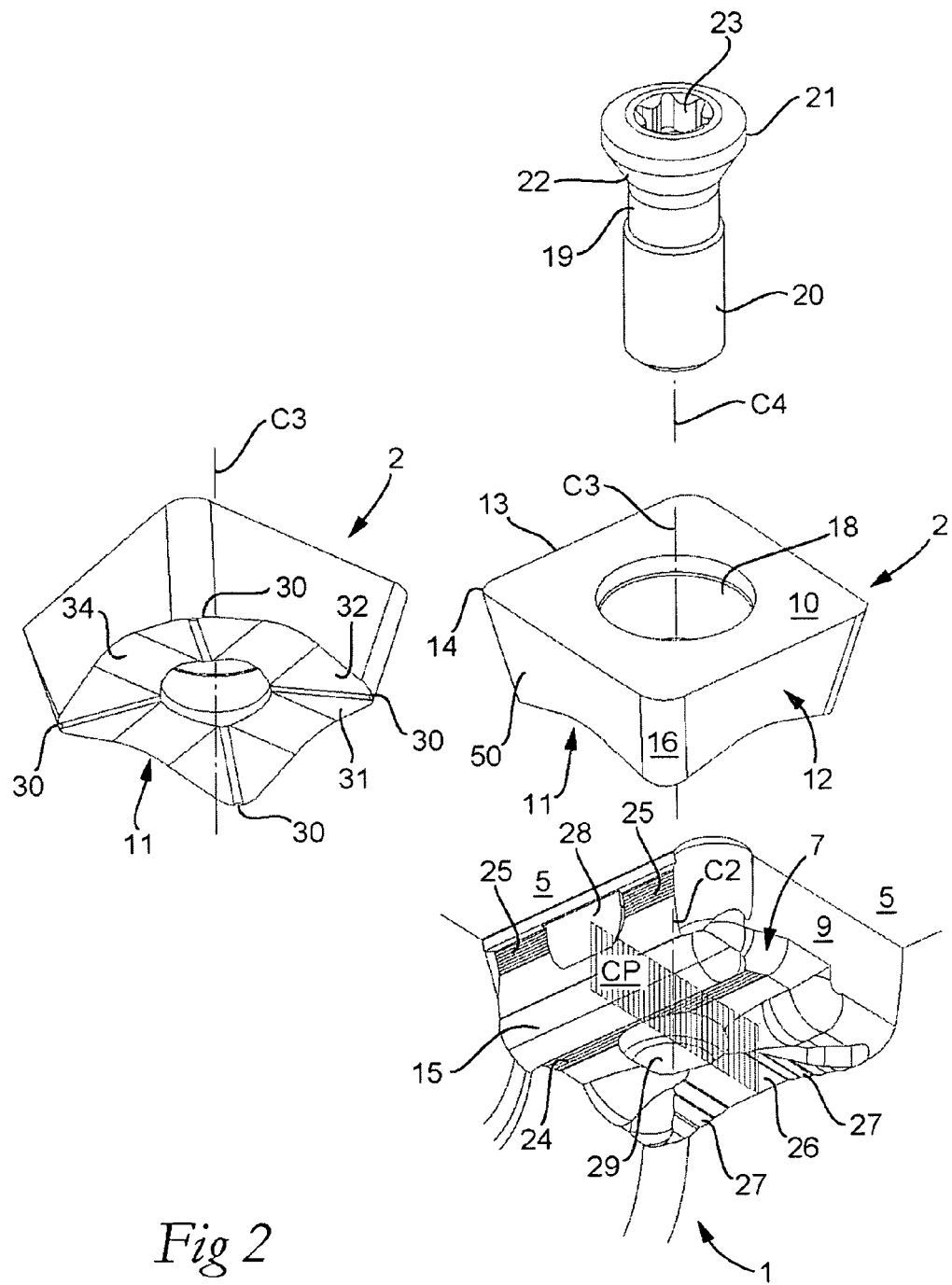
FIG. 2 is an enlarged, partly simplified exploded view showing a connecting surface included in the basic body, a cutting insert separated from the same surface in a top perspective and bottom perspective view, as well as a screw for clamping the cutting insert.

From the enlarged exploded view in FIG. 2, it is seen that the cutting insert 2 includes an upperside 10 and an underside 11, between which a peripheral clearance surface, generally designated 12, extends. The topography of the underside 11 of the cutting insert forms a secondary connecting surface arranged to cooperate with the primary connecting surface 7 in the basic body.

In the example shown, the cutting insert has a polygonal, more precisely square basic shape, and includes therefore four cutting edges, which individually are formed of a straight, chip-removing main edge 13 and a surface-wiping secondary edge 14 (e.g., a wiper edge) adjacent to each corner. The square shape means that the clearance surface, in its entirety designated 12, in this case includes four substantially plane part surfaces, which transform into each other via convex corner surfaces 16. The cutting edges 13, 14 are in the usual way formed in the transition between the upperside 10 and the clearance surface 12. In this connection, it should be pointed out that the design of the upperside, for the sake of simplicity, is illustrated in the form of a simple, plane surface. In practice, however, the upperside forms a chip surface in which more or less complicated chip breakers may be included.

Between the upperside and the underside of the cutting insert, a centre axis designated C3 extends, which is centrally situated in the cutting insert so far that all cutting edges and clearance part surfaces are situated at the same distances from the same. In the example shown, when the cutting insert is fixed by means of a screw 17, the axis C3 also forms a centre axis of a through hole 18 in the cutting insert.

As a matter of form, it should be pointed out that in practice, the cutting insert is manufactured from cemented carbide or another hard and wear-resistant material, while the basic body is manufactured from a softer material, above all steel or aluminum. The screw 17, which advantageously is manufactured from steel, includes a shank 19 having a male thread 20, as well as a head 21 having a cone surface 22 and a key grip 23. The centre axis of the screw is designated C4.

In each one of the connecting surfaces 7, 11, male-like as well as female-like engagement means are included for mutual engagement. These engagement means are delimited by flank surfaces or flanks, those of which that are included in the basic body 1 henceforth will be denominated support flanks, while those flanks that are included in the cutting insert 2 will be denominated contact flanks.

In the primary connecting surface 7 of the basic body 1, a V-shapedly diverging seat 15 is formed, which is delimited by two support flanks 24, 25 and which forms a female-like engagement means. A second, male-like engagement means of the connecting surface 7 consists of a saddle-like part 26, which is delimited by two V-shapedly converging support flanks 27. The two support flanks 24, 25 are comparatively long and narrow, while the two support flanks 27 are short and wide. Note that the support flank 25 (which is included in the side surface 8 of the pocket 6) in this case includes two part surfaces that are spaced-apart by a shallow countersink 28. In this case the two support flanks 27 of the saddle part 26 are plane and run parallel to each other and extend perpendicularly to the length extension of the support flanks 24, 25. The support flanks 24, 25 generally extend in the axial direction of the tool, and the support flanks 27 in the radial direction thereof. However, it should be emphasized that the connecting surface 7 may be tipped-in into the basic body at moderate axial and radial angles. In other words, the support flanks 24, 25 do not need to be parallel to the centre axis C1 of the basic body.

In the connecting surface 7, a hole 29 mouths having a centre axis C2. In the hole, a female thread (not visible) is formed in which the male thread 20 of the screw 17 may be fastened. In practice, the inherent elasticity of the screw 17 is utilized to apply a lateral tightening force to the cutting insert 2, which force presses the same against the support flank 25. This takes place by the holes 18, 29 being eccentrically located so far that the distance between the centre axis C3 of the cutting insert and the clearance surface 12 thereof is somewhat greater than the distance between the centre axis C2 and the support flank 25. Upon final tightening of the screw, the same will therefore be deformed elastically and resiliently press the cutting insert against the support flank 25.

A central plane coinciding with the centre axis C2 and situated halfway between the support flanks 27 is designated CP in FIG. 2.

The secondary connecting surface 11 of the cutting insert 2 includes four knobs 30 situated in corners, each one of which knobs is delimited by a pair of contact flanks 31, 32. Because the preferred cutting insert shown in FIG. 2 is indexable (in this case in four positions), said contact flanks 31, 32 will be alternatingly utilized to delimit male-like engagement means and female-like engagement means, as will be clear from the subsequent description.

Figure 3:
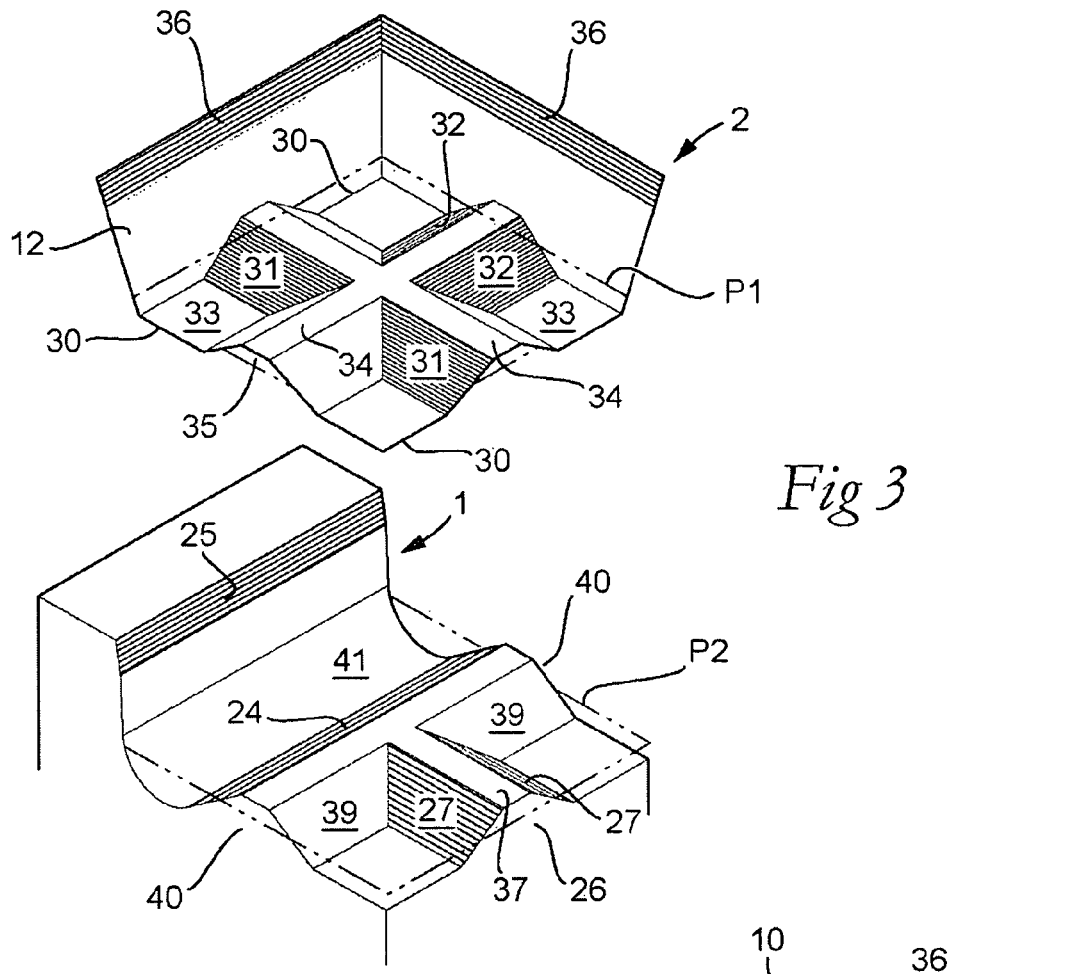
FIG. 3 is a perspective exploded view, which in a simplified or stylized form illustrates the formation of a primary connecting surface in a tool basic body, and a secondary connecting surface in the cutting insert.
Figure 3:
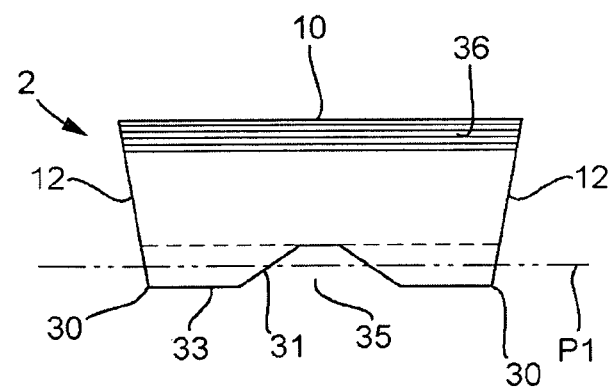
Figure 4:
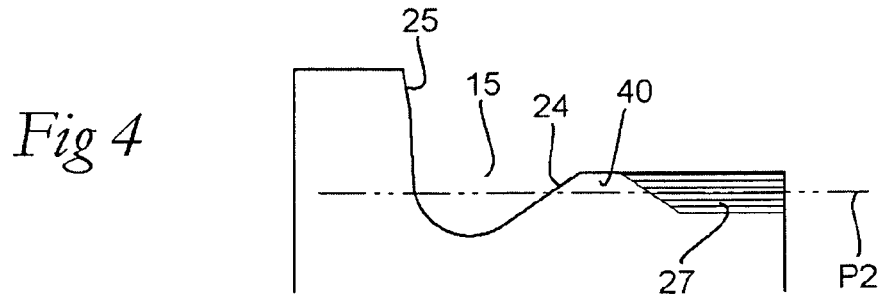
FIG. 4 is an exploded side view, which in the same stylized manner shows the cutting insert and the basic body according to FIG. 3.

In order to facilitate understanding, the concrete interface in question between the cutting insert and the basic body has also been illustrated schematically or stylized in FIGS. 3 and 4. In the proper embodiment according to FIGS. 1 and 2, the two connecting surfaces 7, 11 have a fairly flat or shallow topography, which may be difficult to be clearly perceived by the eye. Therefore, in FIGS. 3 and 4, the connecting surfaces are shown with an exaggeratedly deep topography and a partly simplified geometry, among other things so far that the four knobs 30 of the cutting insert have been given the shape of truncated, four-sided pyramids having plane end surfaces 33, which are not found in the proper embodiment.

The four knobs 30 are mutually spaced-apart by two long narrow intermediate surfaces 34, which intercept each other at a right angle in the centre of the cutting insert. Of the totally eight contact flanks, four are simultaneously active when the cutting insert is mounted in the basic body, e.g., those that are shaded in FIG. 3. The two analogous contact flanks 31 that are situated on two adjacent knobs extend in flush with each other, i.e., are situated in a common, inclined plane. In this connection, it should be pointed out that all contact flanks are inclined in relation to the secondary connecting surface. The two contact flanks 32 facing each other together delimit a chute, which is designated 35. Among said contact flanks 32, the two shaded ones are urged against the two support flanks 27 that delimit the saddle part 26. Simultaneously, the shaded contact flanks 31 are urged against the support flank 24. Said support flank 24 delimits, together with the support flank 25, the V-shapedly diverging seat 15 that opens obliquely inward/upward toward the chip space in the basic body. In the figures, the shaded fields 36 along the upper parts of the clearance surfaces 12 designate the part of each part surface that can be urged against the support flank 25.

Characteristic is that the contact flanks 31, 32 of the knobs 30 are situated in a common basal plane P1, while the surface parts or the contact zones 36 are situated above said basal plane. Correspondingly, the three support flanks 24 and 27 are situated in a common bottom plane P2, while the support flank 25 is situated on a level above the bottom plane. This means that at the same time as the cooperating contact and support flanks present in the planes P1, P2 guarantee the locking of the cutting insert, i.e., counteract turning and rectilinear displacement of the same, the high-positioned support flank 25 will afford a stable lateral support to the cutting insert, more precisely in the contact zone 36 situated near the upper part of the clearance surface (in practice the contact zone 36 can be located above the half height or thickness of the cutting insert and preferably very near the upper borderline of the clearance surface 12, however, without reaching up to the same). In milling, the dominant cutting forces are the radial forces. By supporting the cutting insert radially in the described way by means of the robust and resistant support flank 25, considerable radial forces can be carried without the cutting insert running the risk of being displaced in the radial direction. Because the axial cutting forces are small, these forces can without problem be carried simultaneously by the moderately deep saddle part 26.

With continued reference to FIGS. 3 and 4, it should be pointed out that the two support flanks 27 of the saddle part 26 converge into a common summit 37 in the form of a part surface included in a T-shaped, plane surface, which also forms a summit between the support flank 24 and two side surfaces 39 of a ridge-like part designated 40 of the primary connecting surface. The surfaces 39 are not in contact with any one of the knobs 30 of the cutting insert. Between the two support flanks 24, a concave clearance surface 41 extends, which neither is in contact with the cutting insert. The T-surface 37 is parallel to the bottom plane P2.

Figure 5:
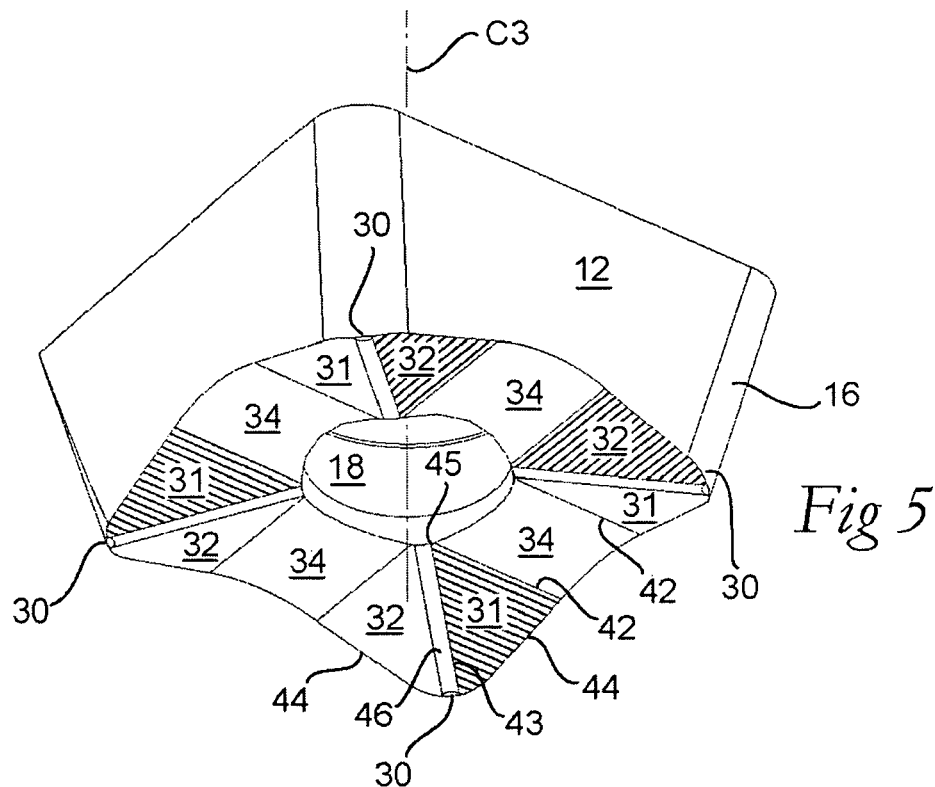
FIG. 5 is an additional enlarged bottom perspective view of the concrete cutting insert included in the tool according to FIG. 1.

Reference is now made to FIGS. 5-8, which on an enlarged scale again illustrate the concrete, preferred embodiment of the cutting insert of the tool and basic body (of FIGS. 1 and 2). In FIG. 5, it is seen that each one of the two contact flanks 31, 32 of the individual knob 30 has a triangular basic shape, which is defined by three borderlines 42, 43, 44. Because the cutting insert in this case is square, and indexable in four positions, all contact flanks of the knobs are identical. The two borderlines 42, 43 are straight and diverge from an inner end point 45 toward the periphery of the cutting insert. The borderline 42 delimits the knob from the individual intermediate surface 34, which in this case has a concave shape. The borderline 43 delimits the individual contact flank 31, 32 from a suitably convex, narrow radius transition 46, which separates the two contact flanks of one and the same knob. The two peripherally situated borderlines 44 extend obliquely downward outward from the intermediate surfaces 34 and converge into a corner adjacent to the convex corner surfaces 16 of the cutting insert. Therefore, adjacent to the corners, the borderlines 44 are partly arched. The two borderlines 42, which together delimit an intermediate surface 34, are mutually parallel, besides which all borderlines 42 are situated in a common plane parallel to the basal plane P1 of the cutting insert (according to FIG. 4). The four knobs 30 as well as the four intermediate surfaces 34 are in this case mutually spaced-apart by the central hole 18 of the cutting insert.

Figure 7:
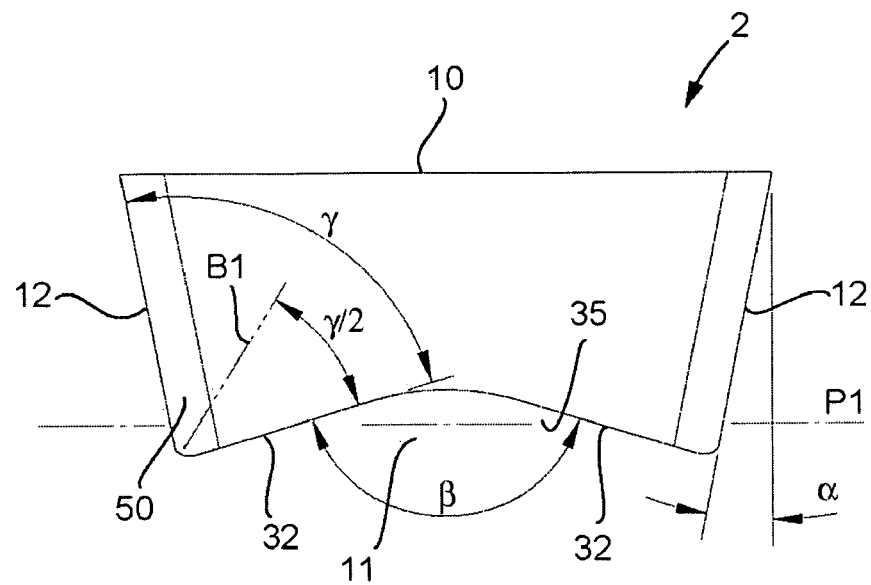
FIG. 7 is an exploded side view of the cutting insert according to FIG. 5 and the basic body according to FIG. 6.
Figure 7:
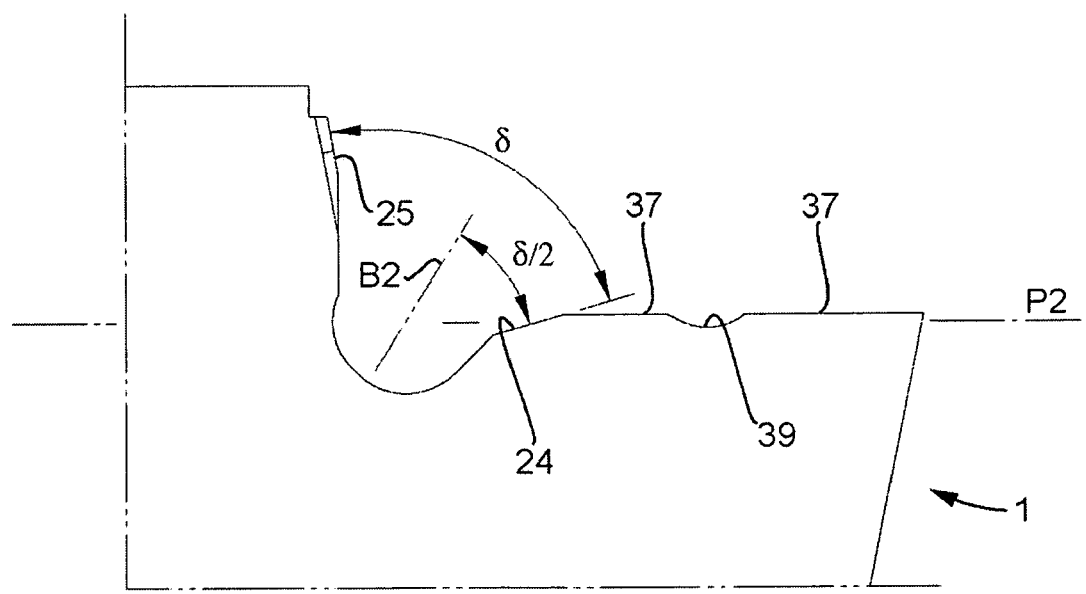

In FIG. 7, α designates the clearance angle of the surface 12, i.e., the angle that the clearance surface 12 forms with an imaginary plane perpendicular to the upperside of the cutting insert. In the example shown, the clearance angle α amounts to 11°.

The two contact flanks facing each other, e.g., the flanks 32, which together delimit the downwardly opening V-chute 35 in the underside of the cutting insert, form an obtuse angle β with each other. In the example, said angle β amounts to 146°. In practice, this angle may vary, but should at all events amount to at least 135° and at most 160°. Most suitably, the angle β is within the interval of 140-150°.

Together with the clearance surface 12, the individual contact flank (the flank 32 in the example according to FIG. 7) delimits a wedge-shapedly tapering part 50 of the cutting insert. In the example, the wedge angle γ of said wedge part 50, i.e., the angle between the clearance surface 12 and the individual contact flank, amounts to 84° (β/2+α). The wedge angle γ may also vary, more precisely depending on varying clearance angles (α) and varying obtuse angles (β). Most suitably, γ is acute and amounts to at least 45°. However, the possibility is not excluded of making the wedge part 50 (and the cooperating seat 15) with a limitedly obtuse angle γ, e.g., up to 100°. Advantageously, however, γ is within the interval of 60-85°.

Concerning the geometry of the secondary connecting surface 11, in conclusion it should be pointed out that the individual contact flank 31, 32 extends all the way up to the clearance surface 12, where the peripheral borderline 44 forms a sharp transition against the clearance surface. In other words, in this case there are no transition surfaces between the contact flank and the clearance surface.

Figure 6:
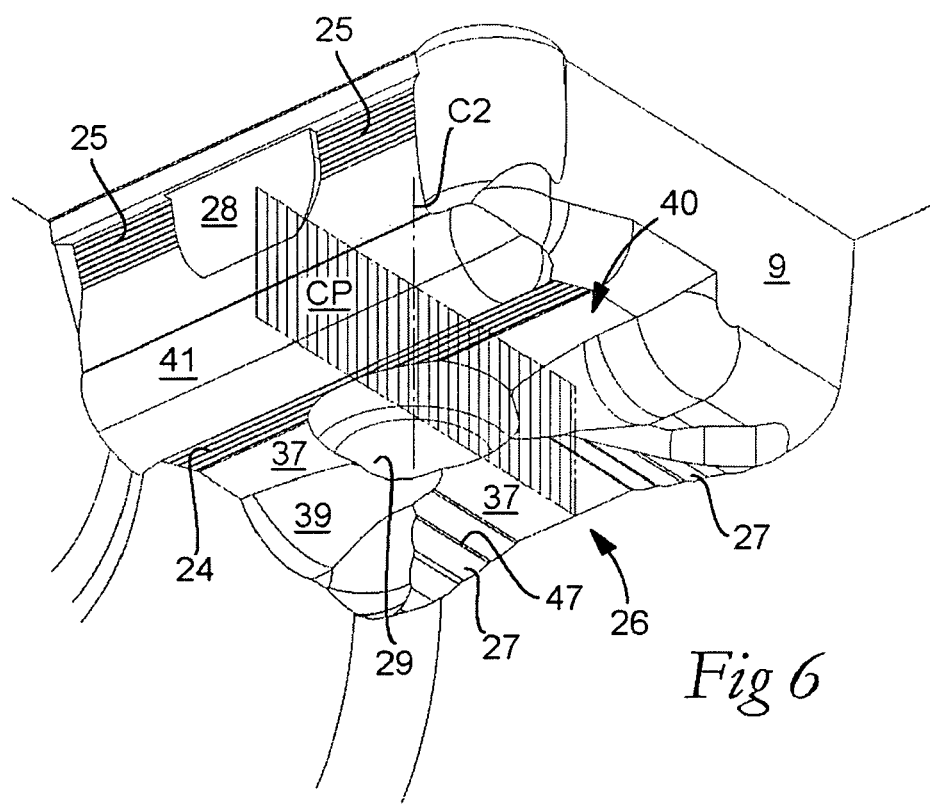
FIG. 6 is a top perspective view of the primary connecting surface of the basic body.

In FIG. 6, it is seen that the two side surfaces 39, which partly delimit the ridge 40 and separate the same from the saddle part 26, have a concave shape in the concrete embodiment. Furthermore, the two support flanks 27 of the saddle part 26 have a triangular basic shape corresponding to the triangular shape of the contact flanks 31, 32 of the cutting insert. More precisely, the individual support flank is widest adjacent to the summit surface 37 and successively tapers in the direction away from the summit surface. Suitably, the individual support flank 27 is somewhat smaller than the cooperating contact flank 31, 32 of the cutting insert in order for the latter to corbel out somewhat from the first-mentioned one.

According to an exemplary embodiment, the individual support flank 27 (see FIGS. 6 and 8) is formed with a plurality of mutually spaced-apart, fairly thin crests 47, which are mutually spaced-apart by wider, concave wave surfaces 48. The crests 47 are differently long, more precisely in such a way that the crest present closest to the summit surface 37 is longest, and then the lengths successively decrease to define the triangular shape of the support flank. Advantageously, the crests are also differently wide, more precisely in such a way that the longest crest is thinnest, and then the width increases by decreasing length. In such a way, the bearing surfaces afforded by the individual crests will be equally large, in spite of the varying lengths. However, in this connection, it should be pointed out that the support flanks 27 also may have another shape, e.g., plane.

Because the material of the basic body, e.g., steel, is softer than the material of the cutting insert, the crests 47 may be deformed plastically by so-called coining, after a certain use of the tool. In such a way, the risk of overdetermination of the cutting insert is counteracted in case the same would be impaired by minor form defects.

Mutually, the support flanks 27 form an obtuse angle (lacking designation) that advantageously exactly corresponds with the obtuse angle β of the chute 35 of the cutting insert. In such a way, all wave crests 47 of the support flanks 27 of the saddle part 26 get simultaneous contact with the contact flanks of the cutting insert, in order to together afford a thorough support already when the tool begins to be used. In this connection, it should be noted that also the angles γ and δ may be exactly equally large. However, in practice, it is preferred that the angles γ and δ are made very slightly different, e.g., some minute or second. In this way, the effect is attained that the contact between, on one hand, the surfaces 12, 32 of the wedge part 50 of the cutting insert, and on the other hand the support flanks 24, 25 of the basic body, initially is established in the form of a line contact, which after coining of the material of the basic body propagates in the form of a successively increasing surface contact.

In the connecting surface 11 of the cutting insert 2, all contact flanks 31, 32 are identical and located on exactly the same level positions in relation to the basal plane P1. In the connecting surface 7 of the basic body 1, however, the two support flanks 27 of the saddle part 26 have a shape that differs from the shape of the support flank 24 present on the ridge 40. Nevertheless, the three support flanks 24, 27 are essentially situated in a common bottom plane P2, in relation to which the support flank 25 is considerably elevated.

The function of the described interface is briefly described as follows:

When the cutting insert is to be mounted in the basic body, the same is let down into the pocket 6 that is delimited by the primary connecting surface 7 and the support flank 25 of the side surface 8. Depending on the index position of the cutting insert, either a pair of contact flanks 32 or a pair of contact flanks 31 will rest against the two support flanks 27 of the saddle part 26. Suppose that the two flanks 32 are located on top of the support flanks 27. Two contact flanks 31 situated in flush with each other will then abut against the support flank 24, at the same time as the upper part 36 of the individual clearance surface 12 of the cutting insert is urged against the two part surfaces that together form the support flank 25.

In the next step, the tightening screw 17, more precisely the male thread 20 thereof, is applied in the hole 29 in the primary connecting surface 7. When tightening the screw, the cutting insert will be subjected to, on one hand, a downwardly directed tightening force that presses the contact flanks 32 against the support flanks 27, and the contact flanks 31 against the support flank 24, and on the other hand a lateral tightening force that presses the clearance surface of the cutting insert against the support flank 25. This takes place by the fact that the screw upon the final tightening thereof is deformed elastically, the inherent elasticity of the steel—via the cone surface 22 of the screw—transferring a spring force that acts laterally in the cutting insert.

When the cutting insert has been finally anchored, the robust lateral support, which is afforded by the support flank 25 of the solid basic body, guarantees that considerable radial forces can be carried without the cutting insert being dislodged from the position thereof. The moderate axial forces that act on the cutting insert can without problems be simultaneously carried by the saddle part 26, in spite of the same being fairly shallow. Moreover, in cooperation with the V-chute 15 delimited by the support flanks 24, 25, the saddle part 26 counteracts turning of the cutting insert in an efficient way. In this connection, it should be pointed out that the cutting insert is not in contact with the axially rear side surface 9 that delimits the pocket 6 in the basic body.

Reference is now made to FIGS. 9 and 10, which illustrate an alternative embodiment of a cutting insert. In this case, the cutting insert is elongate and therefore indexable in only two positions. The four knobs 30 included in the secondary connecting surface 11 of the cutting insert are still located in an imaginary, regular quadrangle, which in this case, however, consists of a rectangle instead of a square. Because of the elongate basic shape of the cutting insert, the two contact flanks 31, 32 of each knob are no longer identical, but has an individual shape that varies depending on the other geometry of the connecting surface. In addition, the two intermediate surfaces 34, which intercept each other in the centre of the cutting insert, are differently wide and differently deeply situated. Furthermore, it should be pointed out that the clearance surface 12 urged against the support flank 25 of the primary connecting surface in this case includes two part surfaces 12a, 12b that are spaced-apart by a clearance space in the form of a countersink 28.

Figure 11:
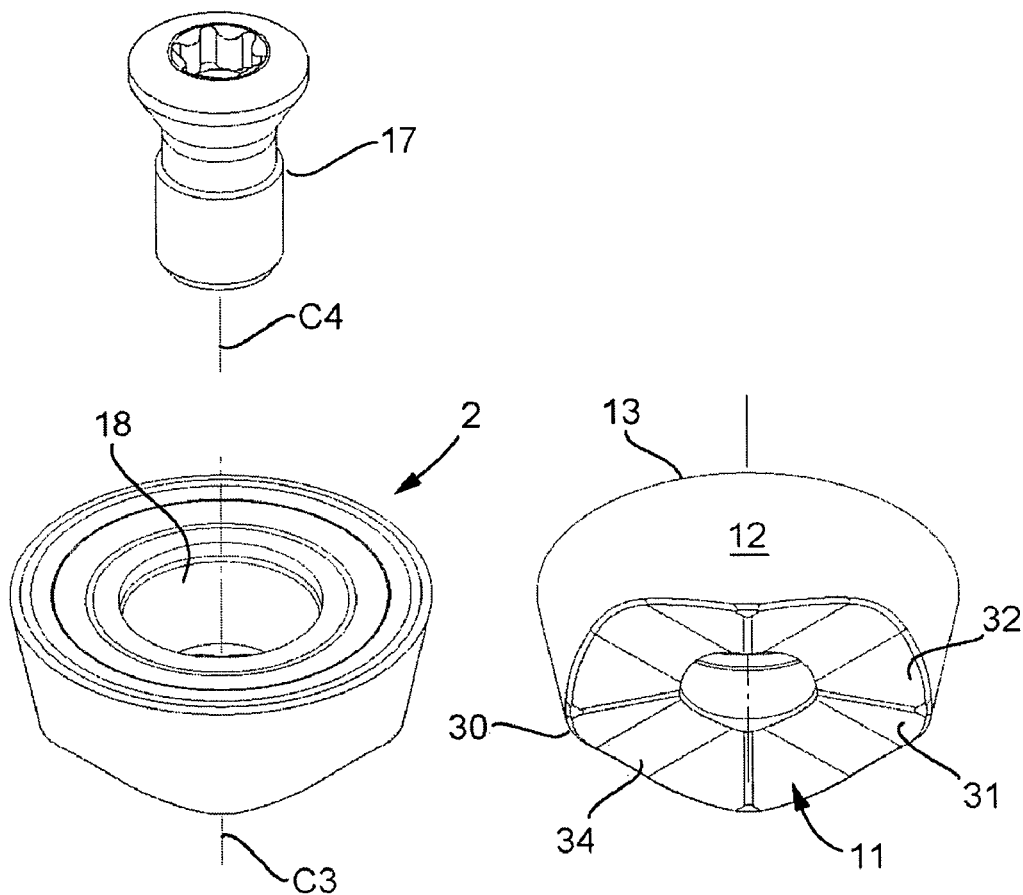
FIG. 11 is a perspective exploded view showing a tool having a round cutting insert.
Figure 11:
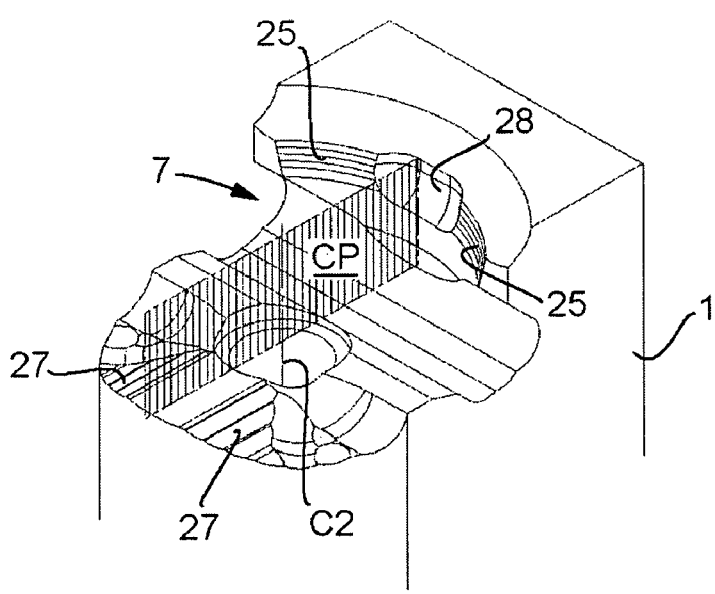

In FIG. 11 is shown a cutting tool, the cutting insert 2 of which has a round basic shape. Thus, the cutting insert includes a single continuous, rotationally symmetrical clearance surface 12 adjacent to an endless cutting edge 13 having a circular shape. A secondary connecting surface 11 on the underside of the cutting insert includes—like the embodiment according to FIGS. 5-8—four knobs 30, the two contact flanks 31, 32 of which are identical. This means that the cutting insert can be indexed in four positions.

The primary connecting surface 7 in the basic body 1 differs from the previously described connecting surface only in that the support flank 25 in this case is composed of concave part surfaces instead of plane ones. Radial forces applied to the cutting insert in the direction of the central plane CP are therefore distributed in diverging force components that act against each one of the part surfaces (which are spaced-apart by a countersink 28).

Figure 12:
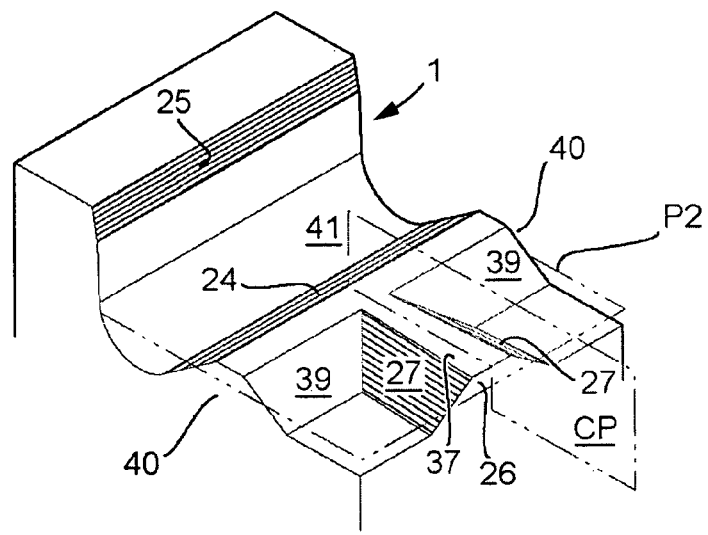
FIG. 12 is a stylized perspective view showing a slightly modified embodiment of the primary connecting surface shown in FIG. 3.

FIG. 12 illustrates the possibility of modifying the support flanks 27 of the saddle part 26. In this case these flanks converge slightly, more precisely towards the ridge 40. This means that the contact flanks of the cutting insert will initially get only line contact or restricted surface contact with the outermost portion of the saddle part 26 (whereafter the area of contact may be enlarged by coining). In this connection it should also be mentioned that not only the support flanks 24, 25, 27, but also the cooperating contact flanks 31, 32 do not necessarily always be absolutely plane. Thus, at least one of two cooperating flanks may be made with a non-planar shape, e.g. slightly convex or as a facet surface.

Figures 13, 14:
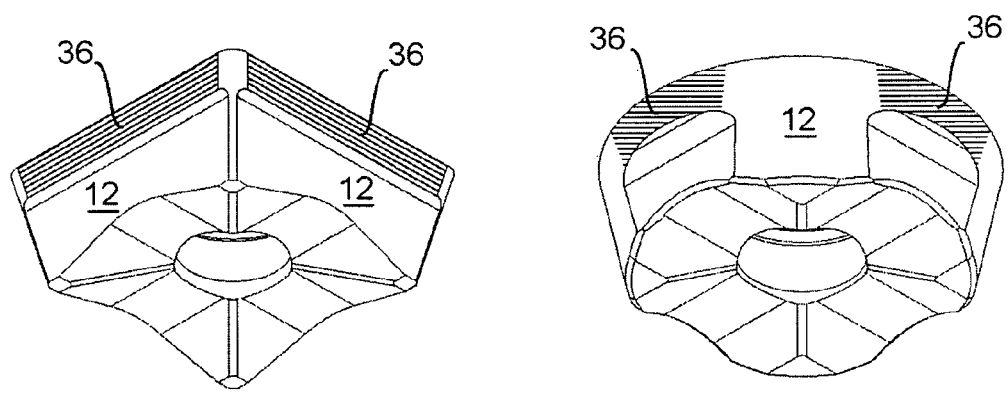
FIG. 13 is a bottom perspective view showing a cutting insert having modified clearance surfaces.
FIG. 14 is a bottom perspective view showing an alternative embodiment of a round cutting insert.

In the embodiment shown in FIGS. 1-8 each clearance surface 12 of the square cutting insert 2 is plane and extends all the way between the upper and lower sides thereof, the contact flank 36 being located in flush with the rest of the surface. FIG. 13 illustrates a modified cutting insert 2 in which each contact flank 36 forms part of an upper ledge or border which protrudes from the rest of the clearance surface 12. When such a cutting insert is used, it is possible to let the elevated support flank 25 of the basic body 1 (see FIGS. 3 and 12) form part of a plane surface extending all the way down to the bottom of the V-seat, instead of making it angled.

FIG. 14 depicts a round cutting insert in which a number (in this case four) of recesses are made in the clearance surface 12, while leaving rather narrow contact flanks 36 above each recess. Like the cutting insert of FIG. 13, the cutting insert of FIG. 14 may be urged with each contact flank 36 against a support flank 25 (cf. FIG. 11) extending unbroken all the way down to the bottom of the V-seat.

Feasible Modifications of the Invention

The invention is not limited only to the embodiments described above and shown in the drawings. Although the invention has been exemplified in connection with a milling cutter and a milling insert, the same may accordingly be applied also to other tools for chip removing machining, in particular such tools the cutting inserts of which are subjected to dominant cutting forces in a single, well-defined direction. This line of force action does not need to be exactly radial, such as in the exemplified milling cutter, but may be arbitrarily orientated in the tool, e.g., axially or diagonally between the axial and radial directions. Even if the invention is generally applicable to rotatable cutting tools (e.g., drills) as well as fixed tools (e.g., turning tools), the same is, however, particularly advantageous in connection with milling cutter tools, such as, for instance, end mills and face mills, slitting cutters, long-edge milling cutters, and the like. Furthermore, a plurality of modifications of details may be made within the scope of the attached claims. Thus, for instance, any crests in the support flanks of the saddle part may have another shape than rectilinear, e.g. arched, circular, oval, etc, or be in the form of small knobs or warts. It is also conceivable to provide the contact flanks of the cutting insert with crests of various shape. It is also conceivable to form the primary connecting surface in a separate shim or support plate which is in turn stably anchored in the basic body in any suitable manner. What is more, the cutting insert may be composed of two or more layers of different material, e.g. a hard upper layer and a softer lower layer.

At last, but not least, it should be mentioned that the complete tool does not necessarily have to be equipped with indexable cutting inserts, though indexable cutting inserts are, indeed, preferred in practice. Thus, protection should not be excluded for a tool including cutting inserts having merely one usable cutting edge.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A tool for chip removing machining, comprising:
    a basic body; and
    a cutting insert, which includes an upperside and an underside between which a centre axis and, adjacent to a cutting edge, a peripheral clearance surface extend,
    wherein the basic body includes a primary connecting surface that is arranged for locking of the cutting insert and has engagement means delimited by first, third, and fourth support flanks that are located in a common bottom plane and inclined in relation to the same and a second support flank located in a different plane,
    wherein the cutting insert includes a secondary connecting surface that is formed in the underside and has engagement means delimited by contact flanks that are located in a common basal plane and inclined in relation to the same and at least one additional contact flank in a different plane,
    wherein, among the cooperating first and second support flanks, which together delimit a V-shapedly diverging seat in the basic body, the first support flank is situated in said bottom plane, and the second support flank on a level above the same, and
    wherein among cooperating first and second contact flanks, which together delimit a V-shapedly converging wedge part of the cutting insert, the first contact flank is one of the contact flanks situated in said common basal plane, while the second contact flank is the at least one additional contact flank and is a part of the clearance surface situated on a level above the common basal plane and urged against the second support flank.

2. The tool according to claim 1, wherein an angle ($\delta$) between the first and second support flanks, which together delimit the V-shaped seat in the basic body, is acute and amounts to at least 45°, and that an angle ($\gamma$) between the first contact flank and the second contact flank is acute.

3. The tool according to claim 2, wherein the angle ($\gamma$) between the first contact flank and the second contact flank is substantially the same as the angle ($\delta$) between the first and second support flanks, which together delimit the V-shaped seat in the basic body.

4. The tool according to claim 2, wherein an angle ($\beta$) between two of the contact flanks located in said common basal plane, which together delimit a chute in the secondary connecting surface and act as third and fourth contact flanks, is obtuse and is at least 135° and at most 160°, and wherein the third and fourth support flanks, which together delimit a male engagement means of the primary connecting surface, are arranged at an obtuse angle that is as large as the angle ($\beta$) between the third and fourth contact flanks.

5. The tool according to claim 1, wherein an angle ($\beta$) between two of the contact flanks located in said common basal plane, which together delimit a chute in the secondary connecting surface and act as third and fourth contact flanks, is obtuse and is at least 135° and at most 160°, and wherein the third and fourth support flanks, which together delimit a male engagement means of the primary connecting surface, are arranged at an obtuse angle that is as large as the angle ($\beta$) between the third and fourth contact flanks.

6. The tool according to claim 1, wherein the secondary connecting surface in the cutting insert comprises four knobs that are located in corners in an imaginary, regular quadrangle and individually include two contact flanks inclined in relation to the basal plane of the connecting surface and running perpendicularly to each other, one contact flank of which is situated in flush with an analogous contact flank of an adjacent knob, and the other contact flank is opposite an analogous flank of the same adjacent knob in order to, together with the same, delimit a V-shapedly diverging chute and act as third and fourth contact flanks, the third and fourth contact flanks of the chute being urged against the third and fourth support flanks, which are V-shapedly converging support flanks of a male engagement means in the form of a saddle part included in the primary connecting surface.

7. The tool according to claim 6, wherein the contact flanks of an individual knob of the cutting insert have a triangular basic shape, which is defined by three borderlines, two of which diverge at an acute angle toward the periphery of the cutting insert, and wherein at least one of the third and fourth support flank of the saddle part of the primary connecting surface has a triangular basic shape corresponding to the shape of the contact flanks.

8. The tool according to claim 7, wherein the at least one of the third and fourth support flank of the saddle part is smaller than the contact flanks of the individual knob of the cutting insert in order for the contact flank to corbel out from the support flank.

9. The tool according to claim 7, wherein at least one of the contact flanks of the individual knob of the connecting surface of the cutting insert is a plane surface.

10. The tool according to claim 7, wherein at least one of the third and fourth support flank included in the primary connecting surface comprises a plurality of mutually spaced-apart crests, which are deformable by coining of the material of the basic body.

11. The tool according to claim 10, wherein adjacent crests are differently long in order to define the triangular basic shape of the support flank.

12. The tool according to claim 11, wherein the crests are differently wide.

13. The tool according to claim 11, wherein a short crest is wider than a longer crest.

14. The tool according to claim 7, wherein adjacent knobs of the connecting surface of the cutting insert are mutually spaced-apart via concave intermediate surfaces, which are individually delimited by two parallel borderlines, and spaced-apart from summit surfaces of the saddle part as well as of a ridge extending at an angle to the same and included in the connecting surface of the basic body.

15. The tool according to claim 7, wherein the cutting insert has a square basic shape and is indexable in four positions, all contact flanks of the different knobs being identical.

16. The tool according to claim 7, wherein the cutting insert has a rectangular basic shape and is indexable in two positions, the two flanks of the individual knob being non-uniform.

17. The tool according to claim 7, wherein the contact flanks of the individual knob of the cutting insert extend all the way up to the peripheral clearance surface in which it transforms via a sharp borderline.

18. The tool according to claim 1, wherein a hole in the connecting surface of the basic body is eccentrically located relative to a hole in the cutting insert, the hole in the connecting surface of the basic body and the hole in the cutting insert.

19. An indexable cutting insert for tools for chip removing machining, comprising:
an upperside and an underside between which a centre axis and, adjacent to a cutting edge, a peripheral clearance surface extend, as well as a connecting surface formed in the underside and in which there are included engagement means having flanks that are situated in a common basal plane and inclined in relation to the same,
wherein the engagement means includes four knobs that are located at corners in an imaginary, regular quadrangle and individually include two flanks running perpendicularly to each other, one flank of which is situated in flush with an analogous flank of an adjacent knob, together forming a pair of first flanks, and the other flank facing an analogous flank of the same adjacent knob to delimit a V-shapedly diverging chute, said pair of first flanks being arranged to, together with a part of the clearance surface situated on a level above the basal plane, form a wedge part of the cutting insert, wherein an angle ($\beta$) between the two opposite flanks that delimit the chute is at least 135°.

20. The cutting insert according to claim 19, wherein an angle ($\gamma$) between the clearance surface and at least one of the flanks is acute and is at least 45°.

21. The cutting insert according to claim 19, wherein the angle ($\beta$) between the two opposite flanks that delimits the chute is at most 160°.

22. The cutting insert according to claim 19, wherein at least one of the flanks has a triangular basic shape, which is defined by three borderlines, two of which diverge at an acute angle toward a periphery of the cutting insert.

23. The cutting insert according to claim 22, wherein adjacent knobs are mutually spaced-apart via concave intermediate surfaces, each one of which is delimited by two parallel borderlines of adjacent knobs.

24. The cutting insert according to claim 23, wherein all borderlines that pair-wise delimit intermediate surfaces are situated in a common plane parallel to the basal plane.

25. The cutting insert according to claim 19, wherein an angle ($\gamma$) between the clearance surface and at least one of the flanks is acute and is at least 45°, wherein an angle ($\beta$) between the two opposite flanks that delimits the chute is at least 135°, and wherein the at least one of the flanks is a plane surface.

26. The cutting insert according claim 19, wherein the cutting insert has a square basic shape and is indexable in four positions, all flanks of the different knobs being identical.

27. The cutting insert according to claim 19, wherein the cutting insert has a rectangular basic shape and is indexable in two positions, the two flanks of the individual knob being non-uniform.

28. The tool according to claim 19, wherein the contact flanks of the individual knob of the cutting insert extend all the way up to the peripheral clearance surface in which it transforms via a sharp borderline.

29. A basic body for tools for chip removing machining, comprising:
a connecting surface for locking of an indexable cutting insert and having engagement means delimited by first, third, and fourth flanks that are located in a common bottom plane and inclined in relation to the same and a second flank located in a different plane,
wherein, among the cooperating first and second flanks, which together delimit a V-shapedly diverging seat, the first flank situated in said bottom plane and the second flank situated on a level above the bottom plane.

30. The basic body according to claim 29, wherein a second engagement means is a saddle part comprising the third and fourth flanks that converge V-shapedly and extend perpendicularly to the first and second flanks of the seat.

31. The basic body according to claim 30, wherein at least one flank comprises a plurality of mutually spaced-apart crests, which are deformable by coining of the material of the basic body.

32. The basic body according to claim 31, wherein adjacent crests are differently long in order to define the triangular basic shape of the flank.

33. The basic body according to claim 32, wherein the crests are differently wide, more precisely in such a way that a short crest is wider than a longer crest.

34. The basic body according to claim 30, wherein the third and fourth flanks of the saddle part have a triangular basic shape.

35. The basic body according claim 29, wherein an angle ($\delta$) between the first and second flanks that delimits the seat is acute and is at least 45°.

36. An indexable cutting insert for tools for chip removing machining, comprising:

an upperside and an underside between which a centre axis and, adjacent to a cutting edge, a peripheral clearance surface extend, as well as a connecting surface formed in the underside and in which there are included engagement means having flanks that are situated in a common basal plane and inclined in relation to the same, wherein the engagement means includes four knobs that are located at corners in an imaginary, regular quadrangle and the knobs individually include two flanks running perpendicularly to each other, one flank of which is situated in flush with an analogous flank of an adjacent knob, together forming a pair of first flanks, and the other flank facing an analogous flank of the same adjacent knob to delimit a V-shapedly diverging chute, said pair of first flanks being arranged to, together with a part of the clearance surface situated on a level above the basal plane, form a wedge part of the cutting insert, and wherein adjacent knobs are mutually spaced apart via intermediate surfaces.

* * * * *